United States Patent
Hawes

(10) Patent No.: US 6,648,373 B2
(45) Date of Patent: Nov. 18, 2003

(54) FENDER ASSEMBLY AND MOUNTING BRACKET ASSEMBLY THEREFOR

(75) Inventor: Timothy R. Hawes, Muskegon, MI (US)

(73) Assignee: Fleet Engineers, Incorporated, Muskegon, MI (US)

(*) Notice: Subject to any disclaimer, the term of this patent is extended or adjusted under 35 U.S.C. 154(b) by 0 days.

(21) Appl. No.: 09/931,543

(22) Filed: Aug. 16, 2001

(65) Prior Publication Data

US 2002/0024213 A1 Feb. 28, 2002

Related U.S. Application Data

(60) Provisional application No. 60/228,670, filed on Aug. 29, 2000, and provisional application No. 60/269,662, filed on Feb. 16, 2001.

(51) Int. Cl.[7] ............................................... B62D 25/18
(52) U.S. Cl. ........................ 280/854; 280/154; 280/160
(58) Field of Search ................................. 280/854, 848, 280/153.5, 154, 159, 847, 152.2, 152.3, 851, 160

(56) References Cited

U.S. PATENT DOCUMENTS

| | | | | |
|---|---|---|---|---|
| 817,203 A | * | 4/1906 | Thompson | .................. 280/854 |
| 2,972,149 A | * | 2/1961 | Bracesco | .................. 280/152.2 |
| 3,876,229 A | * | 4/1975 | Kohn et al. | .................. 280/847 |
| 4,268,053 A | * | 5/1981 | Toppins et al. | ............. 280/154 |
| 4,314,711 A | * | 2/1982 | Westendorf | .................. 280/154 |
| 4,377,294 A | * | 3/1983 | Lockwood et al. | ......... 280/851 |
| 4,406,474 A | * | 9/1983 | Scharf | ......................... 280/154 |
| 4,706,980 A | * | 11/1987 | Hawes et al. | ............... 280/154 |
| 5,511,808 A | | 4/1996 | Rowland | |
| 6,367,841 B1 | * | 4/2002 | Matthew | ..................... 280/847 |

FOREIGN PATENT DOCUMENTS

| | | |
|---|---|---|
| GB | 310781 | 4/1929 |
| GB | 2151569 | * 7/1985 |

* cited by examiner

Primary Examiner—Brian L. Johnson
Assistant Examiner—Bryan Fischmann
(74) Attorney, Agent, or Firm—McGarry Bair PC

(57) ABSTRACT

A vibration-decoupling connector for mounting a fender to a support arm, the vibration-decoupling connector comprising an isolator having a first surface for directly contacting either the upper or lower surface of the fender; whereby the isolator dampens vibrations between the support arm and the fender to reduce the transfer of vibration forces between the frame and the fender when the support arm is mounted to the frame.

53 Claims, 7 Drawing Sheets

Exhibit E

FENDER ASSEMBLY AND MOUNTING BRACKET ASSEMBLY THEREFOR

RELATED APPLICATIONS

This application claims the benefit of U.S. Provisional Applications Ser. No. 60/228,670 filed Aug. 29, 2000, and No. 60/269,662 filed Feb. 16, 2001.

BACKGROUND OF THE INVENTION

1. Field of the Invention

The invention relates to a fender assembly for a heavy-duty vehicle. In one of its aspects, the invention relates to fender assembly comprising a fender mounted to a support arm by a vibration decoupler that dampens the vibrations acting on the fender. In another of its aspects, the invention relates to a mounting bracket assembly for mounting a vehicle fender to a frame.

2. Related Art

Heavy-duty vehicles, such as a semi-tractor, use fender assemblies to cover the otherwise exposed drive wheels of the tractor. Many fender assemblies are adjustable to accommodate the various semi-tractor configurations and fender types. A common approach for accomplishing the adjustability of the fender assembly is to provide the assembly with an adjustable mounting bracket, which mounts the fender to the vehicle frame in a manner to permit the movement of the fender relative to the vehicle frame and wheels.

Prior mounting brackets comprise an elongated arm that is connected to and laterally offset from a rotationally adjustable mount. The elongated arm mounts a portion of the fender and the rotationally adjustable mount is secured to the vehicle frame. The relative position of the fender to the vehicle and wheels can be adjusted by rotating the rotationally adjustable mount to change the orientation of the elongated arm. The arm and mount can be made from a single piece or from multiple pieces. The rotatable mount can comprise a tube that receives a bolt secured to the frame by a nut. The mount can be rotated by loosening the nut and rotating the tube and re-tightening the nut.

One problem with the prior adjustable brackets is that the fender is typically connected directly to the elongated arm by a traditional mechanical fastener, such as a bolt, with or without an intervening metal clamp. The mechanical connection between the fender and the arm provides for a direct transfer of the forces acting on the fender or bracket to the other of the fender or bracket without any dampening or uncoupling of the forces. The undamped or uncoupled forces can over time fatigue either of the fender or the mounting bracket, resulting in their failure.

The problem is more acute with the fender, which is typically made from a relatively thin material, often plastic, and the fastener passes directly through an opening in the fender and clamps the fender to the arm. The aerodynamic forces acting on the fender and the road forces acting on the fender through the arm result in repeated loads acting on the fender at the inner surface of the fender opening. The forces acting on the inner surface of the opening tend to induce the propagation of cracks or other failure modes in the fender at the opening.

In GB 310,781, a fender is mounted to the vehicle steering system through an arm that permits the rotation of the fender corresponding to the turning of the wheel. Fender brackets are connected to the fender through bushed joints. U.S. Pat. No. 5,511,808 also discloses a fender mounted to the vehicle steering system through an arm that permits the rotation of the fender corresponding to the turning of the wheel. The fender mounting bracket includes a torsion bushing through which the fender can articulate with respect to the frame during turning of the wheel. The fender is spaced from the torsion bushing resulting in moment induced forces, attributable to the loading of the fender, to act on the connection of the fender and the arm and increase the magnitude of the forces acting thereon.

SUMMARY OF THE INVENTION

According to the invention, a fender assembly for a vehicle comprises a longitudinal frame carrying ground-engaging wheels supporting the frame above a road surface and positioned laterally of the frame. The fender assembly comprises: a fender adapted to overlie at least one of the wheels and having an upper surface and a lower surface of a relatively linear cross dimension; a support arm having a first portion adapted to mount to the vehicle frame and an elongated, relatively linear second portion extending laterally from the first portion and across an upper or lower surface of the fender in alignment with the linear cross dimension; and at least one vibration-decoupling connector mounted between the support arm and to the fender. The vibration-decoupling connector includes a vibration dampening isolator adapted to dampen vibrations between the support arm and the fender when the support arm is mounted to the frame.

The fender can have an arcuate longitudinal profile, and a surface of the isolator is in contact with the fender upper or lower surface of the fender, and the isolator surface has a longitudinal profile complementary to the arcuate longitudinal profile of the fender.

The isolator preferably comprises an elastomeric body with a relatively wide surface that is in contact with, and conforms to, the upper or lower surface of the fender and can have a relatively wide surface that is in contact with, and conforms to, the upper or lower surface of the fender. It is preferred that the isolator has an elastomeric body and the elastomeric body forms the relatively wide surface.

The vibration-decoupling connector can further comprises a first fastener assembly that connects the isolator to the fender and a second fastener assembly that connects the isolator to the support arm. The first fastener assembly preferably comprises a mechanical fastener that compresses the isolator's relatively wide surface against the fender. The mechanical fastener can be an internally threaded bushing in the isolator and a threaded fastener passing through the fender and threaded into the internally threaded bushing. The second fastener assembly can comprise an internally threaded bushing in the isolator, a strap overlying the support arm and the isolator, and a threaded fastener passing through the strap and threaded into the internally threaded bushing to retain the support arm between the strap and the isolator.

The isolator is preferably formed with a channel that complements a profile of the support arm and at least a portion of the support arm is received within the isolator channel. The isolator can further include a spacer for adjusting the spatial relationship between the support arm and fender, with the spacer preferably being in direct contact with the fender.

In one embodiment, the first fastener assembly comprises a plate positioned on the opposite side of the fender from the isolator and at least one mechanical fastener passing through the fender and clamping the fender between the plate and the isolator. The second fastener assembly comprises a sleeve in which the support arm is received and the sleeve is mounted to the isolator independent of the first fastener assembly. Preferably, the second fastener further comprises a wall positioned on the isolator and an embossment on the isolator that is deformed over a portion of the wall to retain the sleeve wall on the isolator. The sleeve wall can have an opening through which the isolator embossment extends and is deformed over the wall adjacent the sleeve wall opening.

The isolator embossment can have an axial opening through which the at least one mechanical fastener passes, and the clamping pressure of the at least one fastener deforms the embossment over the sleeve wall adjacent to the embossment axial opening. The embossment is deformed radially outwardly relative to the axial opening.

The first fastener further comprises a sleeve received within the axial opening to limit the compression of the embossment by the mechanical fastener. In this configuration, the mechanical fastener preferably comprises a threaded bolt having a head and a threaded stem and a nut threadably mounted to the stem. A washer can be disposed between the upper portion of the embossment and either of the head or bolt whereby the washer contacts the upper portion of the embossment.

The vibration-decoupling connector comprises a pair of plate-like members with surfaces that are in contact with and conform to the upper and lower surfaces of the fender and a sleeve having an opening that receives the support arm, and wherein one of the plate-like members and the sleeve forms the isolator. Preferably, the isolator is formed of an elastomeric material and at least one of the isolator, body, and plate is a rigid plastic material.

The vibration-decoupling connector further comprises a first fastener assembly connecting the isolator to the fender and a second fastener assembly connecting the isolator to the support arm. The first fastener assembly comprises a mechanical fastener that compresses the isolator relatively wide surface against the fender. The first fastener assembly can also comprise a plate positioned on the opposite side of the fender from the isolator and at least one mechanical fastener passing through the fender and clamping the fender between the plate and the isolator.

In another embodiment of the invention, a bracket assembly for mounting a vehicle fender to a vehicle frame overlying a ground engaging wheel positioned laterally of the frame comprises: a support arm having a first portion adapted to mount to the vehicle frame and an elongated linear second portion extending laterally from the first portion and adapted to extend laterally across an upper or lower surface of the fender; and a pair of vibration-decoupling connectors mounted to the support arm and adapted to mount to the fender. Each of the vibration-decoupling connectors include a vibration dampening isolator adapted to dampen vibrations between the support arm and the fender to reduce the transfer of vibration forces between the frame and the fender when the support arm is mounted to the frame.

The isolator preferably has a relatively flat surface that is in direct contact with the upper or lower surface of the fender. The isolator can include an elastomeric body that isolates vibrations between the support arm and the fender. Preferably, the elastomeric body has a relatively flat surface that is in direct contact with the upper or lower surface of the fender.

A first fastener assembly can be used to connect the isolator to the fender and a second fastener assembly can be used to connect the isolator to the support arm. The first fastener assembly comprises a mechanical fastener that compresses the isolator relatively wide surface against the fender. The first fastener assembly can also include a plate positioned on the opposite side of the fender from the isolator and at least-one mechanical fastener passing through the fender and clamping the fender between the plate and the isolator. The second fastener assembly can also include a sleeve in which the support arm is received and the sleeve is mounted to the isolator independent of the first fastener assembly.

In yet another embodiment, a vibration-decoupling connector comprises: an isolator having a first surface for directly contacting either the upper or lower surface of the fender; a first fastener assembly adapted to connect the isolator to the fender; and a second fastener assembly adapted to connect the isolator to the support arm. The isolator dampens vibrations between the support arm and the fender to reduce the transfer of vibration forces between the frame and the fender when the support arm is mounted to the frame.

DETAILED DESCRIPTION

Figure 1:
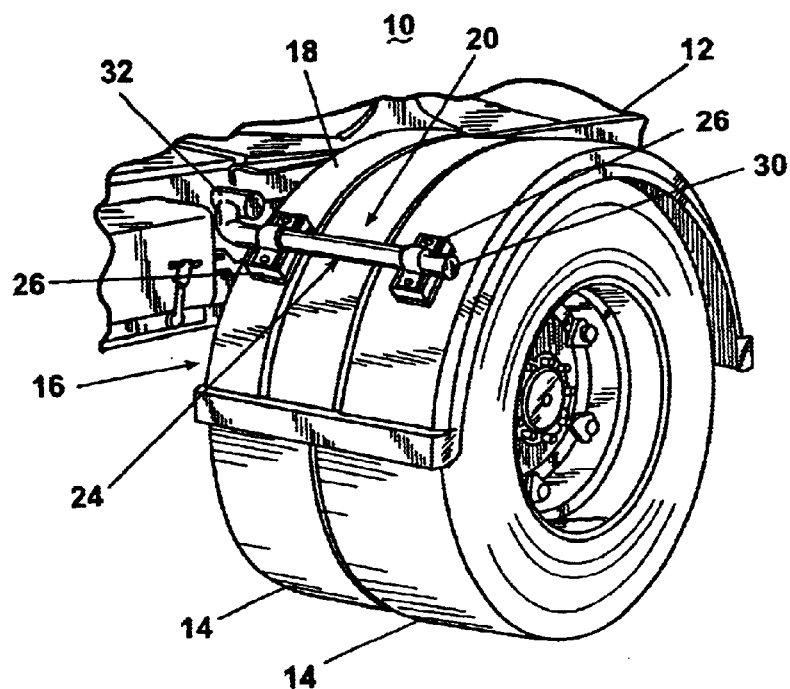
FIG. 1 is a perspective view of a portion of a semi-tractor incorporating the fender assembly and bracket according to the invention.
Figure 3:
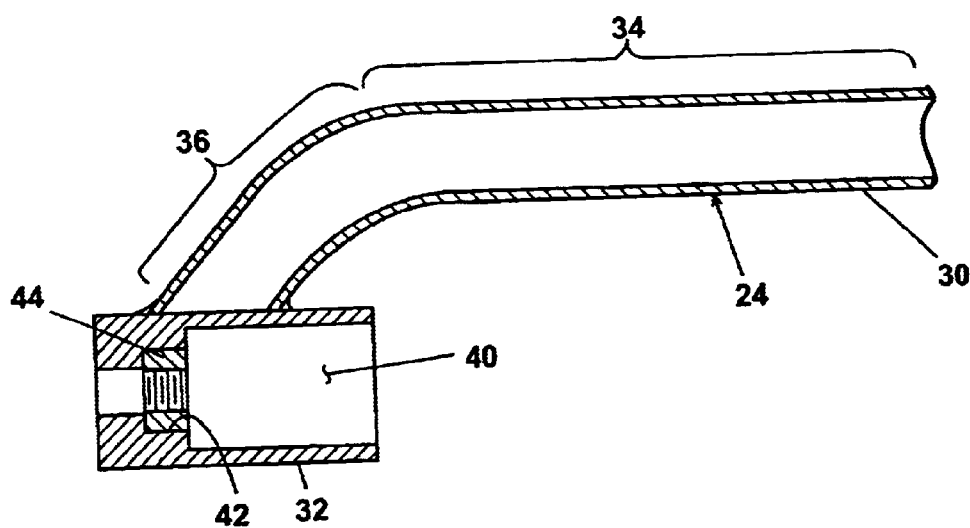
FIG. 3 is a sectional view of the arm assembly of FIG. 2.

Referring now to the drawings, and FIG. 1 in particular, a portion of a heavy-duty vehicle in the form of a semi-tractor 10 has a frame 12 to which are rotatably mounted, ground engaging wheels 14. A fender assembly 16 according to the invention is mounted to the semi-tractor frame 12 and comprises a fender 18 and a bracket assembly 20. The bracket assembly 20 adjustably mounts the fender 18 to the vehicle frame 12 such that the fender 18 can be moved relative to the frame 12. The fender 18 is relatively wide and has an upper surface and a lower surface of a relatively linear cross dimension adapted to overlie the wheels 14.

Figure 2:
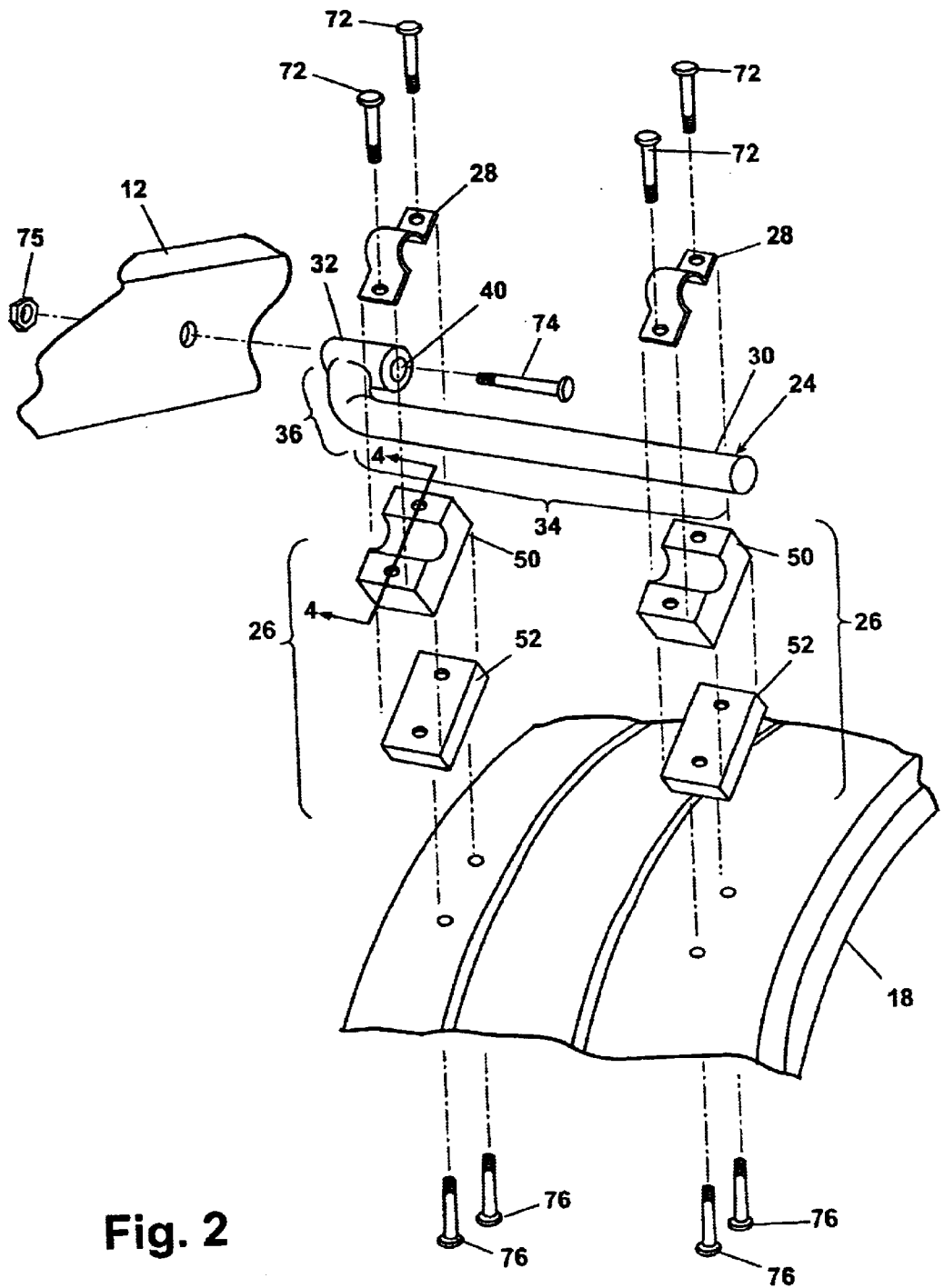
FIG. 2 is an assembly view of the bracket assembly of FIG. 1 and comprising an arm assembly having an arm and an adjustable mount in combination with multiple vibration decoupling connectors.

Referring to FIG. 2, the bracket assembly 20 comprises an arm assembly 24 and multiple vibration-decoupling connectors 26 connected to the arm assembly by fastener assemblies that include straps 28. The arm assembly 24 comprises an elongated arm 30 and a rotationally adjustable mount 32. The elongated arm 30 includes a generally straight portion 34 and a curved portion 36 whose end is welded to the rotationally adjustable mount 32.

The rotationally adjustable mount 32 has an internal bore 40 in which is formed a reduced diameter seat 42 that receives a nut 44. Preferably, the rotationally adjustable mount 32 is formed as a casting with the nut 44 received in the seat 42. It is within the scope of the invention for the nut 44 to have internal threads, which can be replaced by forming threads on the interior of at least a portion of internal bore 40.

Figure 4:
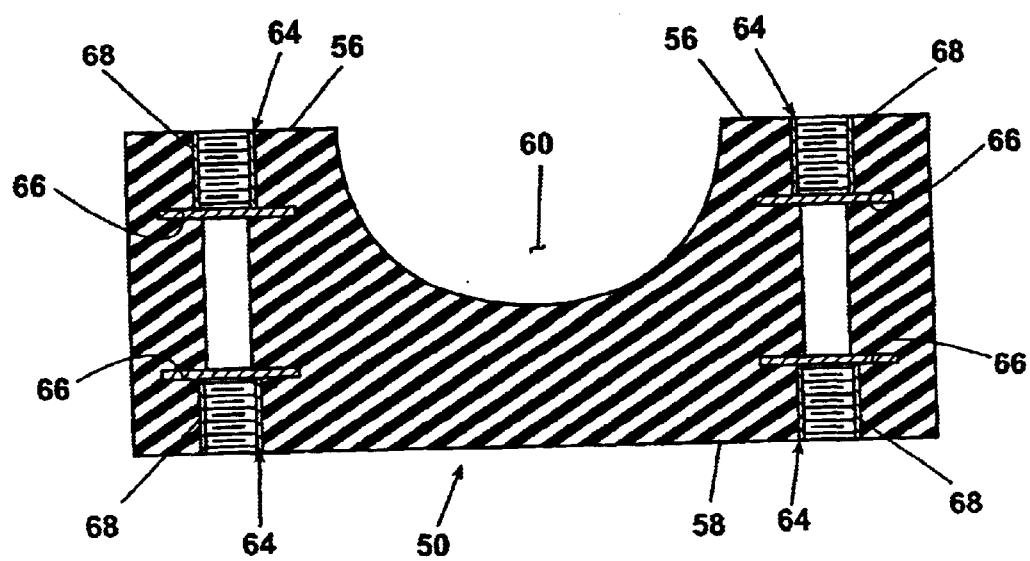
FIG. 4 is a sectional view of one of the vibration decoupling connectors taken along line 4—4 of FIG. 2.

Referring to FIG. 2, the vibration-decoupling connectors 26 comprise an isolator 50 and an optional spacer 52. FIG. 4 illustrates the features of the isolator, which has opposing faces 56, 58. A channel 60 is formed in the face 56 and has a profile that is shaped to receive at least a portion of the straight portion 34 of the elongated arm 30. The isolator 50 is preferably formed of an elastomeric body with a relatively wide face 58 that is in contact with, and conforms to, the upper or lower surface of the fender.

Two pairs of opposing threaded bushings 64 comprising a planar base 66 and a tapped collar 68 are contained within the isolator. Preferably the threaded bushings are insert molded within the decoupler body.

The decoupler body is preferably made from a material that sufficiently dampens the vibrations between the fender and the arm 30. A suitable material is Butyl rubber having a Shore A of approximately 80. The spacer 52 does not necessarily need to perform a dampening function and can be made from SBR (styrenebutadiene rubber) or reprocessed rubber, with a Shore A of approximately 80–90.

The assembly of the fender assembly and its mounting to the vehicle frame will now be described. It should be noted that the sequence of the assembly steps is for illustrative purposes only as there are many different possible sequences. For example, the fender 18 can be mounted to the bracket assembly 20 before or after the mounting of the bracket assembly 20 to the vehicle. Likewise, the arm assembly 24 and vibration decoupling connectors 26 can be mounted to each other before or after the arm assembly 24 is mounted to the vehicle.

Each isolator is mounted to the elongated arm 30 by positioning the isolator relative to the elongated arm such that a portion of the straight portion 34 of the elongated arm 30 is received within the channel 60 of the body face 56. Strap 28 is then placed about the straight portion 34 and bolts 72 are threaded through openings in the strap 28 and into the tapped collar 68 in the body face 56 of the isolator.

The elongated arm 30 is rotatably mounted to the vehicle frame by inserting a bolt 74 through the nut 44 of the rotationally adjustable mount 32. The bolt 74 is further received in a corresponding opening in the vehicle frame and a nut 75 is threaded onto the end of the bolt 74 to fix the arm assembly 24 relative to the vehicle. The rotational position of the arm assembly 24 relative to the vehicle is adjusted by loosening the nut 75 and rotating the arm assembly 24 to the desired position and then re-tightening the nut.

The fender 18 is mounted to the arm assembly 24 through the vibration-decoupling connectors 26 by threading bolts 76 through openings in the fender 18 and into the threaded bushing 64 on the body face 58 of the isolator opposite the body face 56. A washer can be positioned between the head of the bolts 76 and the lower surface of the fender to aid in dispersing the load acting on the portion of the fender surrounding the opening.

When the fender is mounted to the arm assembly, the relative position of the fender to the vehicle frame or tires can be adjusted by rotating the arm assembly 24 by using the rotationally adjustable mount 32. In this manner, the fenders can be moved toward or away from the tires as desired.

An additional advantage of the fender assembly according to the invention is that the fender 18 is connected to the elongated arm 30 through the vibration-decoupling connectors, which effectively decouples the vibration of the fender or elongated arm 30 from being directly transferred to the other of the fender and elongated arm. The vibration-decoupling connectors 26 also dampen the forces acting on the fender and the elongated arm. Since many of the forces acting on the fender and elongated arm are cyclical or high frequency, the vibration-decoupling connectors 26 reduce fatigue related failures over prior fender and bracket assemblies.

The direct connection of the vibration-decoupling connectors 26 to the fender 18 eliminates any intervening structure that would function as a moment arm that would increase the magnitude of the shear, tensile, and compressive forces acting on the fender at the opening. The increased magnitude of the forces attributable to the moments acting on the face of the opening would tend to induce the initiation and propagation of cracks in the face of the opening, which can spread through the fender, leading ultimately to the failure of the fender.

Figure 5:
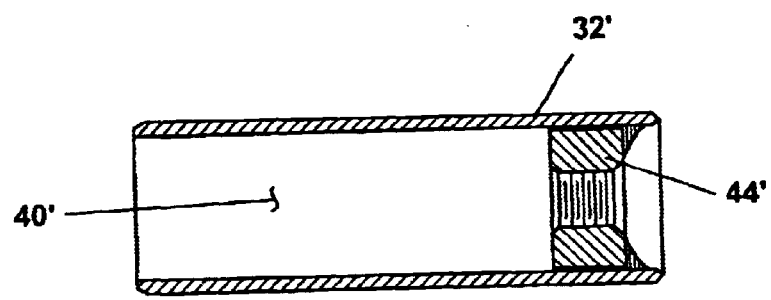
FIG. 5 is an alternative construction of the adjustable mount.

FIG. 5 illustrates an alternative construction for the rotationally adjustable mount. The alternative adjustable mount 32' has an internal bore 40' in which is received a nut 44', which is welded to the mount 32'. The curved portion 36 of the arm assembly 24 is welded to the adjustable mount 32' in the same manner as the adjustable mount 32.

FIGS. 6–10 illustrate an alternative decoupler construction that is preferably used in a top mount fender bracket assembly similar to that disclosed in FIGS. 1–5. However, the alternative decoupler connector 226 could replace the decoupler 26 in the fender bracket assembly 20 for use in either a top mount or bottom mount application.

The alternative decoupler connector 226 comprises a decoupling body 228, an isolator 230 and a clamping plate 232. The decoupling body 228 and isolator 230 are positioned on one side of a fender 218 and the clamping plate 232 is positioned on the other side of the fender 218. Fastener assemblies comprising a bolt 234, washer 235, sleeve 236, and nut 237, with a washer 239, compressively retain the decoupler body 228, isolator 230 and clamping plate 232 to the fender 218.

Referring to FIGS. 6–10, the decoupling body 228 comprises spaced, triangularly shaped side walls 240 between which span a centrally located sleeve 242, which defines a central opening 244 sized to receive the elongated arm 30 of a fender bracket assembly. A tapped set screw opening 246 is formed in the upper portion of the sleeve 242 near the apex of the triangular side walls 240. The tapped set screw opening 246 receives a set screw 248 to retain the elongated arm 30 in a desired rotational as well as longitudinal position in the sleeve 242.

A bottom wall 250 spans and connects the lower edges of the side walls 240. The bottom wall has a lower surface 251 and an upper surface 253. Openings 252 are formed in the bottom wall 250 on opposite sides of the sleeve 242. The openings 252 have a slight flare at their junction with the upper surface 253 of the bottom wall 250. A groove 256 is formed in the lower surface 251 of the bottom wall 250. The lower surface 251 of the bottom wall 250 as illustrated has an arcuate profile.

Preferably, the decoupling body 228 is made from one piece so that the side walls 240, sleeve 242, and bottom wall 250 are all integral. It is preferred that the decoupling body 228 is injection molded and made from a material, such as nylon or glass-filled nylon, that provides for some resiliency in the decoupling body 228, but also is wear and impact resistant.

Figure 6:
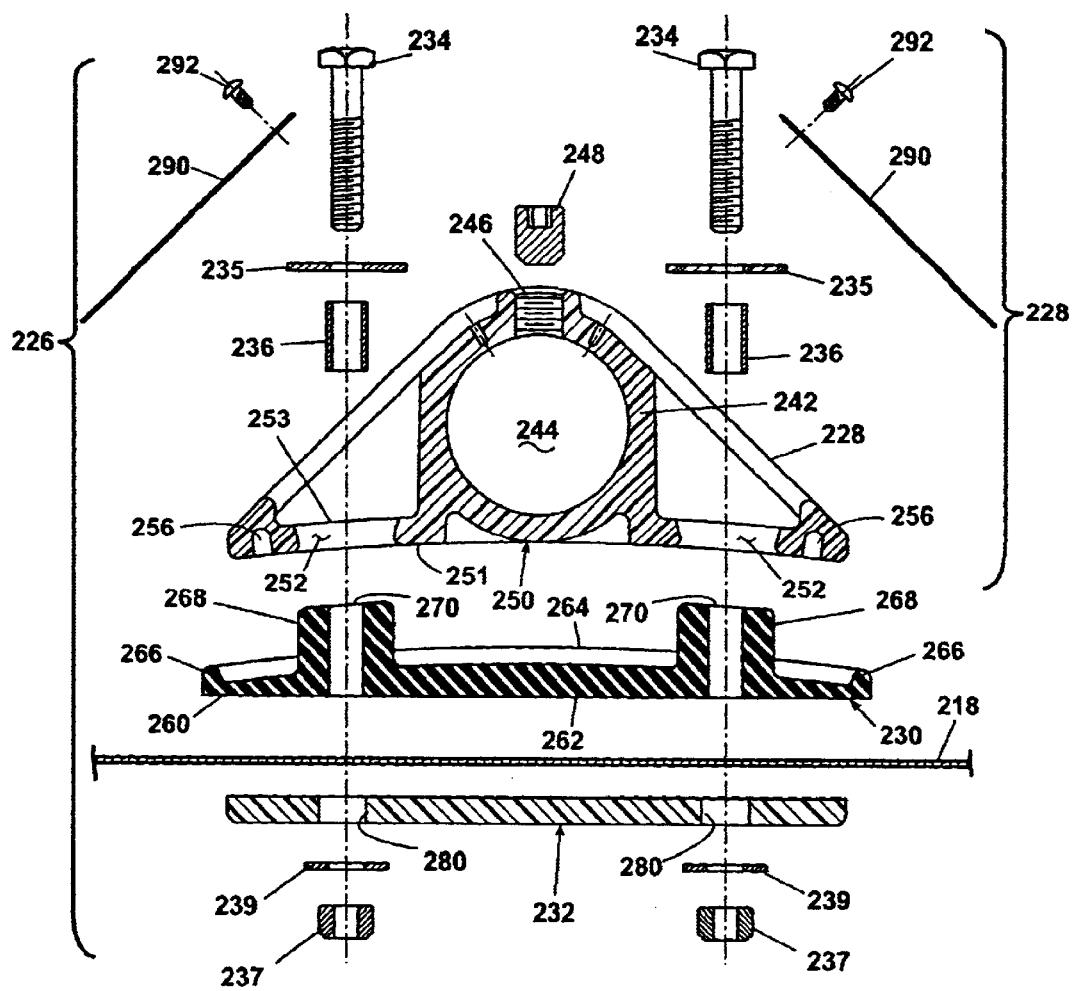
FIG. 6 is an exploded cross-sectional view of an alternative decoupler comprising a mount, a surface adapter, and a clamping plate.
Figure 9:
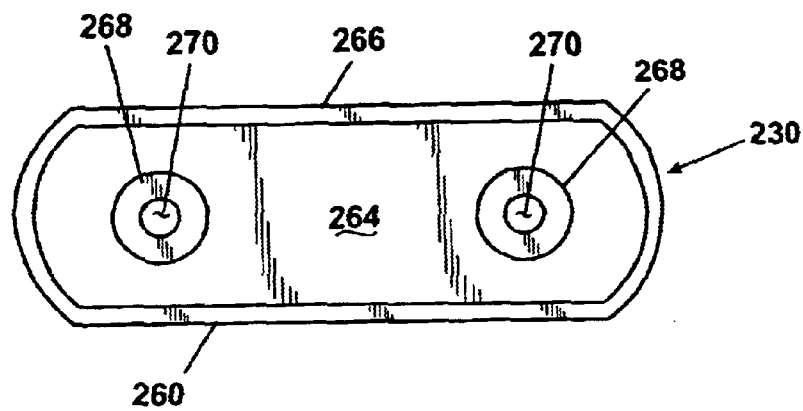
FIG. 9 is a top view of the surface adapter of FIG. 7.

Referring to FIGS. 6 and 9, the isolator 230 comprises an ovate-like base 260 having a flat lower and relatively wide surface 262 and a curved upper surface 264 that is complementary to the decoupling body curved lower surface 251. An alignment rib 266 extends upwardly away from the curved upper surface 264 and is complementary in shape and oversized relative to the periphery of the bottom wall 250 of the decoupling body 228 to aid in aligning the decoupling body and the isolator 230. Mounting embossments 268 also extend upwardly away from the curved upper surface 264 and define corresponding through openings 270, each of which receives a sleeve 236. The mounting embossments 268 are sized to be received within the openings 252 of the decoupling body 228.

The isolator 230 is preferably made as an integral or single piece from a highly flexible material, such as rubber, Butyl rubber and EPDM with a Shore A scale of 60 to 70 durometers. The relatively wide surface 262 is in contact with, and conforms to, the upper or lower surface of the fender 218.

To mount the isolator 230 to the decoupling body 228, the isolator 230 is aligned with the decoupling body 228 so that the mounting embossments 268 are received within the corresponding openings 252 and the decoupling body bottom wall 250 is received within the alignment rib 266 as the isolator 230 and the decoupling body 228 are pressed together.

Figure 10:
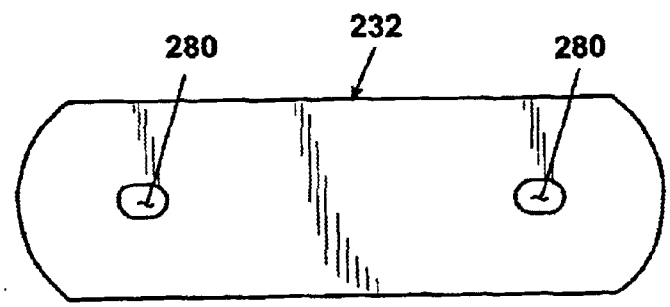
FIG. 10 is a top view of the clamping plate of FIG. 7.

Referring to FIGS. 6 and 10, the clamping plate 232 has an ovate-like platform (as seen in FIG. 10) that corresponds to the base 260 and the bottom wall 250. The clamping plate 232 has a curved profile complementary to the curved profile of the bottom wall 250. A pair of spaced openings 280 are formed in the clamping plate 232 and correspond to the through openings 270 of the isolator 230 and the openings 252 of the decoupling body 228.

The clamping plate 232 is preferably made from a resilient material to enable the clamping plate 232 to flex to enable it to mount against either a flat surface or a curved surface. Preferably, the clamping plate 232 is made from fiberglass-filled nylon, preferably 6—6 nylon with 30% to 35% glass filling.

Figure 7:
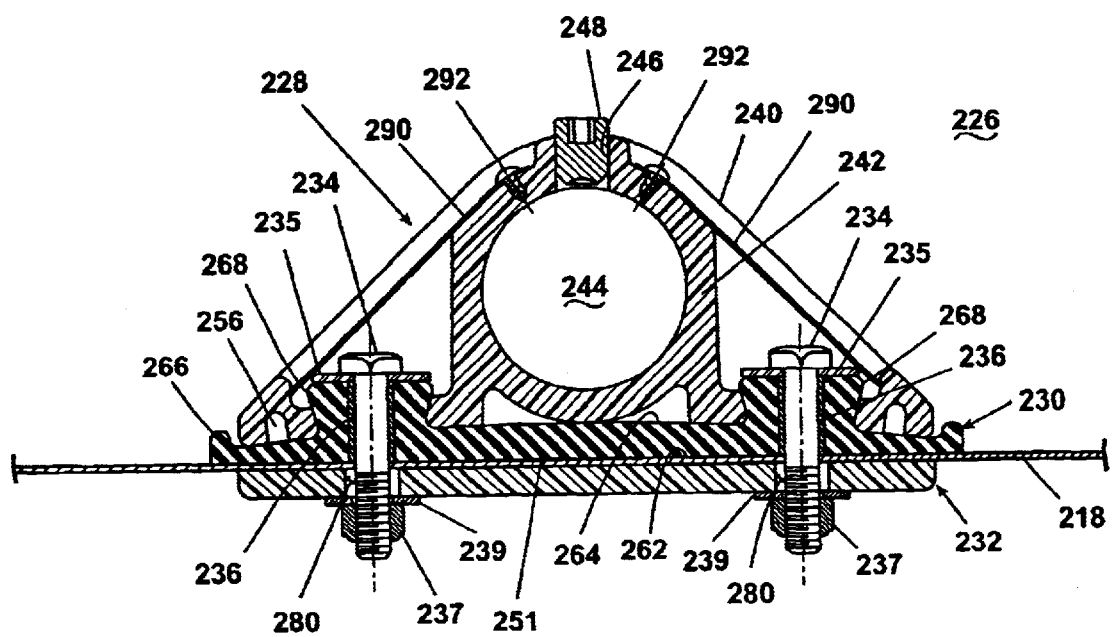
FIG. 7 is a transverse sectional view of the assembled decoupler of FIG. 6.
Figure 8:
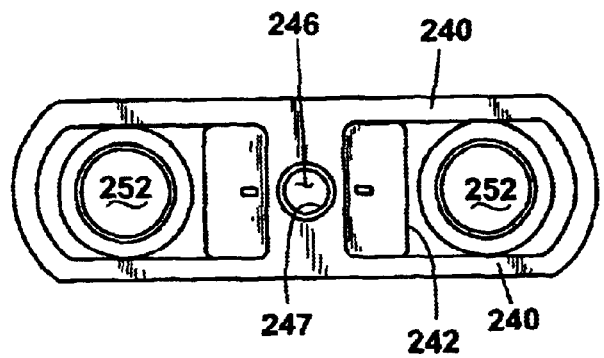
FIG. 8 is a top view of the shaft mount of FIG. 7.

Referring to FIGS. 6 and 7, to assemble the decoupler 226 to a fender along a flat portion of the fender, the isolator 230, with the sleeves 236 inserted in the openings 268, is mounted to the decoupling body 228 by inserting the embossments into the openings 252 as previously described. The subassembly of the decoupling body 228 and isolator 230 is positioned on one side of the fender 218 and the clamping plate 232 is positioned on the other side of the fender 218.

The fastener assemblies compressively retain the fender 218 between the subassembly and the clamping plate 232. For each fastener assembly, the washer 235 is slid onto the corresponding bolt 234, which is then inserted into the sleeve 236, through the fender 218, and through the openings 280 in the clamping plate 232. The washer 239 is placed over the bolt and nut 237 is threaded onto the end of the bolt and tightened. Upon the relative tightening of the nut 237 and bolt 234, the washer 235 is drawn against the embossment to deform a portion of the embossment such that it overlies at least the flared portion of the decoupling body 228 bottom wall 250, which effectively couples the isolator to the decoupling body 228.

The length of the sleeve 236 is sized to limit the deformation of the embossments 268. When the bolt 234 and nut 237 are fully tightened, one end of the sleeve 236 effectively contacts the washer 235 and the other end of the sleeve 236 contacts the fender 218. Thus, the clamping force securing the decoupler 226 to the fender 218 is carried by the bolt 234, washer 235, sleeve 236, fender 218, clamping plate 232, and nut 237, but not the isolator 230 or the decoupling body 228. Since the shaft of the axle bracket is mounted to the decoupling body 228, the shaft and the other bracket components are decoupled from the forces acting on the fender 218.

To complete the assembly, cover plates 290 are attached to the sleeve 250 by fasteners, such as screws 292. The cover plates 290 overlie and protect the fastener assembly components from dirt and the like.

Figure 11:
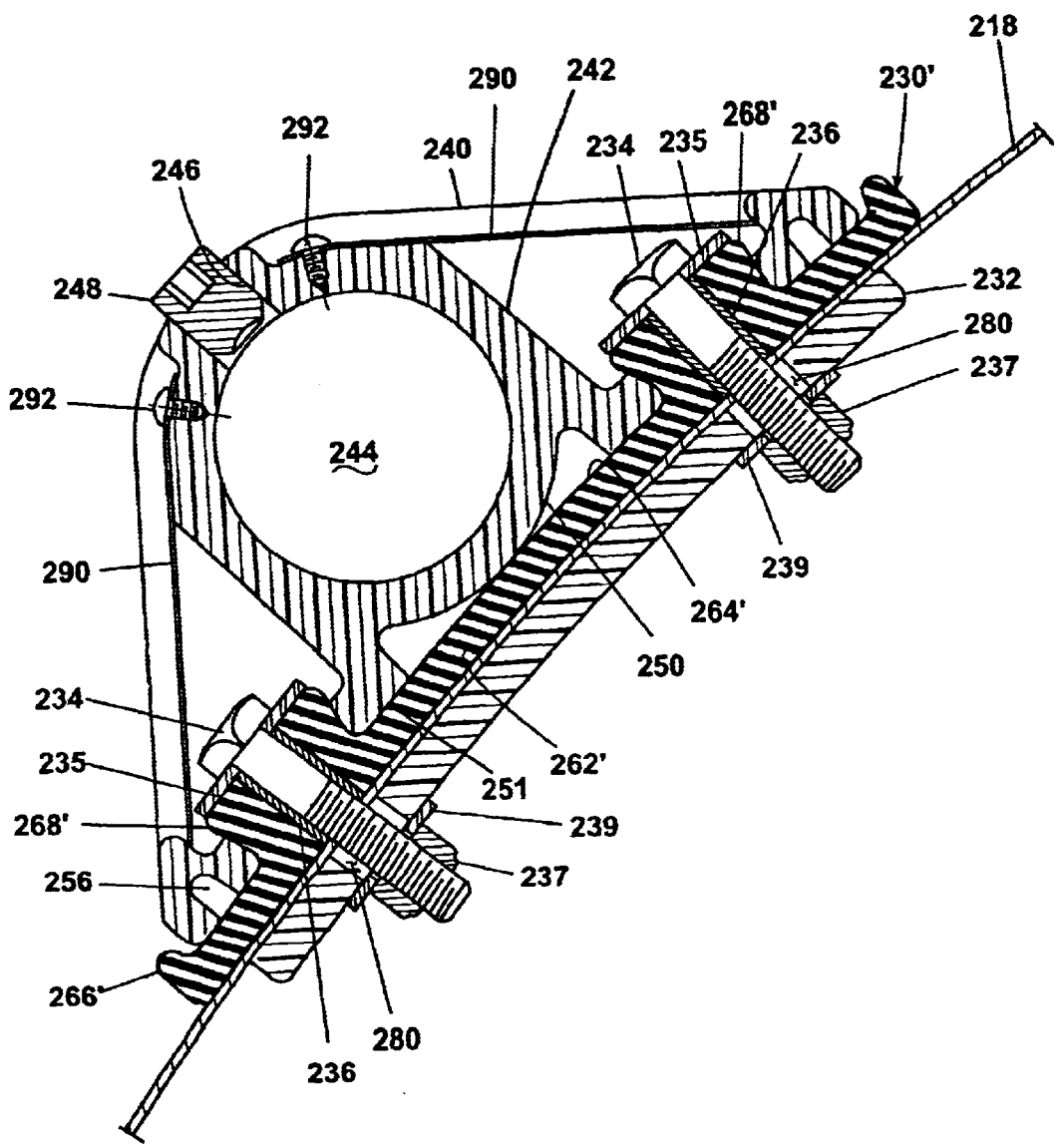
FIG. 11 is a transverse section view of an assembled decoupler similar to that of FIG. 6 mounted on a curved portion of a fender and having an alternative isolator designed for such a curved portion fender mounting.

Referring to FIG. 11, there is illustrated a decoupler for mounting to a longitudinally curved portion of a fender. The decoupler of FIG. 11 is identical to the decoupler of FIGS. 6–10, including a peripheral alignment 266' and mounting embossments 268' except for isolator 230', which has a flat upper surface 264'. Since the isolator upper and lower surfaces 264', 262' are flat and the isolator 230' is made from a flexible material, the isolator 230' effectively will conform to the curved bottom wall lower surface 251 of the decoupling body when assembled. The isolator 230' is made from an elastomeric material and the relatively wide lower surface 262' is in contact with, and conforms to, the upper or lower surface of the fender 218. The clamping plate 232 also has some flexibility and will also conform to the curved surface of the fender.

While the invention has been specifically described in connection with certain specific embodiments thereof, it is to be understood that this is by way of illustration and not of limitation. Reasonable variation and modification are possible within the scope of the disclosure and drawings without departing from the spirit of the invention.

What is claimed is:

1. A fender assembly for a vehicle comprising a longitudinal frame and carrying ground engaging wheels supporting the frame above a road surface and positioned laterally of the frame, the fender assembly comprising:

a fender adapted to overlie at least one of the wheels and having an upper surface and a lower surface of a relatively linear cross dimension;

a support arm having a first portion adapted to mount to the vehicle frame and an elongated, relatively linear second portion extending laterally from the first portion and across an upper or lower surface of the fender in alignment with the linear cross dimension; and at least one vibration-decoupling connector mounted between the support arm and the fender, the vibration-decoupling connector including a vibration dampening isolator adapted to dampen vibrations between the support arm and the fender when the support arm is mounted to the frame and further comprising a first fastener directly connecting the isolator to the fender, a second fastener directly connecting the isolator to the support arm, and the first and second fasteners joined and separated by the isolator.

2. The fender assembly according to claim 1 wherein the isolator comprises an elastomeric body with a relatively wide surface that is in contact with, and conforms to, the upper or lower surface of the fender.

3. The fender assembly according to claim 1 wherein the isolator has a relatively wide surface that is in contact with, and conforms to, the upper or lower surface of the fender.

4. The fender assembly according to claim 3 wherein the isolator includes an elastomeric body.

5. The fender assembly according to claim 4 wherein there are two of the vibration-decoupling connectors mounted between the fender and the support arm.

6. A fender assembly for a vehicle according to claim 1
wherein the isolator includes an elastomeric body that forms a relatively wide surface that is in direct contact with, and conforms to, the upper or lower surface of the fender;
wherein the vibration-decoupling connector further comprises a first fastener assembly connecting the isolator to the fender and a second fastener assembly connecting the isolator to the support arm; and
wherein the first fastener comprises a mechanical fastener that compresses the isolator relatively wide surface against the fender.

7. The fender assembly according to claim 1 wherein the first fastener comprises a plate positioned on the opposite side of the fender from the isolator and at least one mechanical fastener passing through the fender and clamping the fender between the plate and the isolator.

8. The fender assembly according to claim 1 wherein the fender has an arcuate longitudinal profile, and a surface of the isolator is in contact with the fender upper or lower surface, and the isolator surface has a longitudinal profile complementary to the arcuate longitudinal profile of the fender.

9. The fender assembly according to claim 1 wherein there are two of the vibration-decoupling connectors mounted between the fender and the support arm.

10. The fender assembly according to claim 1 wherein the first fastener comprises a mechanical fastener that compresses to isolator relatively wide surface against the fender.

11. The fender assembly according to claim 1 wherein the first fastener comprises a plate positioned on the opposite side of the fender from the isolator and at least one mechanical fastener passing through the fender and clamping to fonder between the plate and to isolator.

12. The fender assembly according to claim 1 wherein the first and second fasteners are joined solely by the isolator.

13. A fender assembly for a vehicle comprising a longitudinal frame and carrying ground engaging wheels supporting the frame above a road surface and positioned laterally of the frame, the fender assembly comprising:
a fender adapted to overlie at least one of the wheels and having an upper surface and a lower surface of a relatively linear cross dimension;
a support arm having a first portion adapted to mount to the vehicle frame and an elongated, relatively linear second portion extending laterally from the first portion and across an upper or lower surface of the fender in alignment with the linear cross dimension;
at least one vibration-decoupling connector mounted between the support arm and the fender, the vibration-decoupling connector including a vibration dampening isolator adapted to dampen vibrations between the support arm and the fender when the support arm is mounted to the frame;
wherein the isolator includes an elastomeric body that forms a relatively wide surface that is in direct contact with, and conforms to, the upper or lower surface of the fender;
wherein the vibration-decoupling connector further comprises a first fastener assembly connecting the isolator to the fender and a second fastener assembly connecting the isolator to the support arm;
wherein the first fastener assembly comprises a mechanical fastener that compresses the isolator relatively wide surface against the fender; and
wherein the mechanical fastener comprises an internally threaded bushing in the isolator and a threaded fastener passing through the fender and threaded into the internally threaded bushing.

14. The fender assembly according to claim 13 wherein the second fastener assembly comprises an internally threaded bushing in the isolator, a strap overlying the support arm and the isolator, and a threaded fastener passing through the strap and treaded into the internally threaded bushing to retain the support arm between the strap and the isolator.

15. The fender assembly according to claim 14 wherein the isolator is formed with a channel that complements a profile of the support arm and at least a portion of the support arm is received within the isolator channel.

16. The fender assembly according to claim 15 wherein the isolator includes a spacer for adjusting the spatial relationship between the support arm and fender.

17. The fender assembly according to claim 16 wherein the spacer is in direct contact with the fender.

18. A fender assembly for a vehicle comprising a longitudinal frame and carrying ground engaging wheels supporting the frame above a road surface and positioned laterally of the frame, the fender assembly comprising:
a fender adapted to overlie at least one of the wheels and having an upper surface and a lower surface of a relatively linear cross dimension;
a support arm having a first portion adapted to mount to the vehicle frame and an elongated, relatively linear second portion extending laterally from the first portion and across an upper or lower surface of the fender in alignment wit the linear cross dimension; and
at least one vibration-decoupling connector mounted between the support arm and the fender, the vibration-decoupling connector including a vibration dampening isolator adapted to dampen vibrations between the support arm and the fender when the support arm is mounted to the frame;
wherein the isolator includes an elastomeric body that forms a relatively wide surface that is in direct contact with, and conforms to, the upper or lower surface of the fender;
wherein the vibration-decoupling connector further comprises a first fastener assembly connecting the isolator to the fender and a second fastener assembly connecting the isolator to the support arm; and
wherein the second fastener assembly comprises a sleeve in which the support arm is received and the sleeve is mounted to the isolator independent of the first fastener assembly.

19. The fender assembly according to claim 18 wherein the second fastener assembly further comprises a wall positioned on the isolator and an isolator embossment on the isolator that is deformed over a portion of the wall to retain the sleeve wall on the isolator.

20. The fender assembly according to claim 19 wherein the sleeve wall has an opening and the isolator embossment extends through the sleeve wall opening and is deformed over the wall adjacent the sleeve wall opening.

21. The fender assembly according to claim 20 wherein the first fastener assembly comprises at least one mechanical fastener and the isolator embossment has an axial opening through which the at least one mechanical fastener passes, and the clamping pressure of the at least one fastener deforms the embossment over the sleeve wall adjacent to the embossment axial opening.

22. The fender assembly according to claim 19 wherein the embossment is deformed radially outwardly relative to the axial opening.

23. The fender assembly according to claim 22 wherein the first fastener assembly further comprises a sleeve received within the axial opening to limit the compression of the embossment by the mechanical fastener.

24. The fender assembly according to claim 23 wherein the at least mechanical fastener comprises a threaded bolt having a head and a threaded stem and a nut threadably mounted to the stem.

25. The fender assembly according to claim 24 wherein the mechanical fastener further comprises a washer disposed between the upper portion of the embossment and either of the head or bolt whereby the washer contacts the upper portion of the embossment.

26. A fender assembly for a vehicle comprising a longitudinal frame and carrying ground engaging wheels supporting the frame above a road surface and positioned laterally of the frame, the fender assembly comprising:
- a fender adapted to overlie at least one of the wheels and having an upper surface and a lower surface of a relatively linear cross dimension;
- a support arm having a first portion adapted to mount to the vehicle frame and an elongated, relatively linear second portion extending laterally from the first portion and across an upper or lower surface of the fender in alignment with the linear cross dimension;
- at least one vibration-decoupling connector mounted between the support arm and the fender, the vibration-decoupling connector including a vibration dampening isolator adapted to dampen vibrations between the support arm and the fender when the support arm is mounted to the frame; and
- wherein the vibration-decoupling connector comprises a pair of members with surfaces that are in contact with and conform to the upper and lower surfaces of the fender and a sleeve having an opening that receives the support arm, and wherein one of the members and the sleeve forms the isolator.

27. The fender assembly according to claim 26 wherein the isolator is formed of an elastomeric material.

28. The fender assembly according to claim 27 wherein at least one of the isolator, body, and plate is a rigid plastic material.

29. A fender assembly for a vehicle comprising a longitudinal frame and carrying ground engaging wheels supporting the frame above a road surface and positioned laterally of the frame, the fonder assembly comprising:
- a fender adapted to overlie at least one of the wheels and having an upper surface and a lower surface of a relatively linear cross dimension;
- a support arm having a first portion adapted to mount to the vehicle frame and an elongated, relatively linear second portion extending laterally from the first portion and across an upper or lower surface of the fonder in alignment with the linear cross dimension; and
- at least one vibration-decoupling connector mounted between the support arm and the fender, the vibration-decoupling connector including a vibration dampening isolator adapted to dampen vibrations between to support arm and the fonder when the support arm is mounted to the frame;
- wherein the vibration-decoupling connector further comprises a first fastener assembly connecting the isolator to the fonder and a second fastener assembly connecting to isolator to the support arm;
- wherein the first fastener assembly comprises a plate positioned on the opposite side of the fender from the isolator and at least one mechanical fastener passing through the fender and clamping the fender between the plate and the isolator; and
- wherein the second fastener assembly comprises a sleeve in which the support arm is received and the sleeve is mounted to the isolator independent of the first fastener assembly.

30. A bracket assembly for mounting a vehicle fender to a vehicle frame overlying a ground engaging wheel positioned laterally of the frame, the bracket assembly comprising:
- a support arm having a first portion adapted to mount to the vehicle frame and an elongated linear second portion extending laterally from the first portion and adapted to extend laterally across an upper or lower surface of the fender;
- a pair of vibration-decoupling connectors mounted to the support arm and adapted to mount to the fender, each of the vibration-decoupling connectors including a vibration dampening isolator adapted to decouple vibrations between the support arm and the fender to reduce the transfer of vibration forces between the frame and the fender when the support arm is mounted to the frame; and
- wherein each of the vibration-decoupling connectors comprises a first fastener assembly adapted to connect the isolator to the fender and a second fastener assembly adapted to connect the isolator to the support arm independent of the first fastener assembly and in axial alignment with the first fastener assembly, and wherein the first and second fastener assemblies are joined together by the isolator.

31. The bracket assembly according to claim 30 wherein the first fastener assembly comprises a mechanical fastener that compresses the isolator relatively wide surface against the fender.

32. The bracket assembly according to claim 1 wherein the first fastener assembly comprises a plate positioned on the opposite side of the fender from the isolator and at least one mechanical fastener passing through the fender and clamping the fender between the plate and the isolator.

33. The bracket assembly according to claim 30 wherein the isolator includes an elastomeric body that isolates vibrations between the support arm and the fender.

34. The bracket assembly according to claim 33 wherein the elastomeric body has a relatively flat surface that is in direct contact wit the upper or lower surface of the fender.

35. The bracket assembly according to claim 30 wherein the isolator has a relatively flat surface that is in direct contact with the upper or lower surface of the fender.

36. The fender assembly according to claim 30 wherein the first and second fastener assemblies are joined solely by the isolator.

37. A bracket assembly for mounting a vehicle fender to a vehicle frame overlying a ground engaging wheel positioned laterally of the frame, the bracket assembly comprising:
- a support arm having a first portion adapted to mount to the vehicle frame and an elongated linear second portion extending laterally from the first portion and adapted to extend laterally across an upper or lower surface of the fender; and
- a pair of vibration-decoupling connectors mounted to the support arm and adapted to mount to the fender, each of the vibration-decoupling connectors including a vibration dampening isolator adapted to dampen vibrations between the support arm and the fender to reduce the transfer of vibration forces between the frame and the fender when the support arm is mounted to the frame;
- wherein the isolator includes an elastomeric body that has a relatively flat surface that is in direct contact with the upper or lower surface of the fender and that isolates vibrations between the support arm and the fender;
- a first fastener assembly connecting the isolator to the fender and a second fastener assembly connecting the isolator to the support arm; and
- wherein the second fastener assembly comprises a sleeve in which the support arm is received and the sleeve is mounted to the isolator independent of the first fastener assembly.

38. A vibration-decoupling connector for mounting a fender to a support arm, the vibration-decoupling connector comprising:
- an isolator having a first surface for directly contacting either the upper or lower surface of the fender;
- a first fastener assembly adapted to clamp the isolator to the fender; and
- a second fastener assembly adapted to connect the isolator to the support arm in axial alignment with first fastener assembly so that the first and second fastener assemblies are joined together by the isolator;
- whereby the isolator decouples vibrations between the support arm and the fender to reduce the transfer of vibration forces between the frame and the fender when the support arm is mounted to the frame.

39. The vibration-decoupling connector according to claim 38 wherein the isolator first surface includes a relatively wide surface that is adapted to contact with, and conforms to, the upper or lower surface of the fender.

40. The vibration-decoupling connector according to claim 39 wherein the isolator includes an elastomeric body.

41. The vibration-decoupling connector according to claim 40 wherein the elastomeric body forms the relatively wide surface that is in direct contact with, and conforms to, the upper or lower surface of the fender.

42. The vibration-decoupling connector according to claim 38 wherein the first fastener assembly comprises a mechanical fastener adapted to compress the isolator first surface against the fender.

43. The vibration-decoupling connector according to claim 38 wherein the first fastener assembly comprises a plate positioned on the opposite side of the fender from the isolator and at least one mechanical fastener passing through the fender and clamping the fender between the plate and the isolator.

44. The fender assembly according to claim 38 wherein the first and second fastener assemblies are joined solely by the isolator.

45. A vibration-decoupling connector for mounting a fender to a support arm, the vibration-decoupling connector comprising:
- an isolator having a first surface for directly contacting either the upper or lower surface of the fender;
- a first fastener assembly adapted to connect the isolator to the fender; and
- a second fastener assembly adapted to connect the isolator to the support arm;
- whereby the isolator dampens vibrations between the support arm and the fender to reduce the transfer of vibration forces between the frame and the fender when the support arm is mounted to the frame;
- wherein the first fastener assembly comprises a mechanical fastener adapted to compress the isolator first surface against the fender; and
- wherein the mechanical fastener comprises an internally threaded bushing in the isolator and a threaded fastener passing through the fender and threaded into the internally threaded bushing.

46. The vibration-decoupling connector according to claim 45 wherein the second fastener assembly comprises an internally threaded bushing in the isolator, a strap overlying the support arm and the isolator, and a threaded fastener passing through the strap and threaded into the internally threaded bushing to retain the support arm between the strap and the isolator.

47. The vibration-decoupling connector according to claim 46 wherein the isolator is formed with a channel that complements a profile of the support arm such that at least a portion of the support arm can be received within the isolator channel.

48. The vibration-decoupling connector according to claim 47 wherein the isolator includes a spacer for adjusting the spatial relationship between the support arm and fender.

49. A vibration-decoupling connector for mounting a fender to a support arm, the vibration-decoupling connector comprising:
- an isolator having a first surface for directly contacting either the upper or lower surface of the fender;
- a first fastener assembly adapted to connect the isolator to the fender; and
- a second fastener assembly adapted to connect the isolator to the support arm;
- whereby the isolator dampens vibrations between the support arm and the fender to reduce the transfer of vibration forces between the frame and the fender when the support arm is mounted to the frame;
- wherein the first fastener assembly comprises a plate positioned on the opposite side of the fender from the isolator and at least one mechanical fastener passing through the fender and clamping the fender between the plate and the isolator; and
- wherein the second fastener assembly comprises a sleeve in which the support arm is received and the sleeve is mounted to the isolator independent of the first fastener assembly.

50. The vibration-decoupling connector according to claim 49 wherein the second fastener assembly further comprises a wall positioned on the isolator and an embossment on the isolator that is deformed over a portion of the wall to retain the sleeve wall on the isolator.

51. The vibration-decoupling connector according to claim 50 wherein the sleeve wall has an opening and the isolator embossment extends through the sleeve wall opening and is deformed over the wall adjacent the sleeve wall opening.

52. A vibration-decoupling connector for mounting a fender to a support arm, the vibration-decoupling connector comprising:

an isolator having a first surface for directly contacting either the upper or lower surface of the fender and having at least one embossment with an opening passing therethrough;

a first fastener assembly adapted to connect the isolator to the fender and comprises at least one mechanical fastener adapted to pass through the fender and through the opening in the embossment to clamp the fender to the isolator; and a second fastener assembly adapted to rigidly connect the isolator to the support arm and comprising a wall positioned on the isolator adjacent to the embossment, wherein the isolator embossment is deformed over a portion of the wall to retain the second fastener assembly on the isolator;

whereby the isolator dampens vibrations between the support arm and the fender to reduce the transfer of vibration forces between the frame and the fender when the support arm is mounted to the frame.

53. The vibration-decoupling connector according to claim 52 wherein wall has an opening therethrough and the isolator embossment extends through the wall opening and is deformed over the wall adjacent the wail opening.

* * * * *

UNITED STATES PATENT AND TRADEMARK OFFICE
CERTIFICATE OF CORRECTION

PATENT NO.     : 6,648,373 B2                                          Page 1 of 1
DATED          : November 18, 2003
INVENTOR(S)    : Timothy R. Hawes It is certified that error appears in the above-identified patent and that said Letters Patent is hereby corrected as shown below:

Column 9,
Line 41, "compresses to isolator relatively" should be -- compresses the isolator relatively --

Column 11,
Line 60, "the fonder assembly comprising:" should be -- the fender assembly comprising --

Column 12,
Line 1, "lower surface of the fonder" should be -- the lower surface of the fender --
Line 6, "vibrations between to support" should be -- vibrations between the support --
Line 7, "arm and the fonder" should be -- arm and the fender --
Line 11, "to the fonder" should be -- to the fender --
Line 12, "to isolator to the support arm" should be -- the isolator to the support arm --
Line 51, "according to claim 1" should be -- according to claim 31 --
Line 60, "direct contact wit the" should be -- direct contact with the --

Column 13,
Line 37, "axial alignment with first" should be -- axial alignment with the first --

Column 16,
Line 12, "adjacent the wail opening" should be -- adjacent the wall opening --

Signed and Sealed this

Seventeenth Day of February, 2004

JON W. DUDAS
*Acting Director of the United States Patent and Trademark Office*